United States Patent [19]

Steinecke et al.

[11] Patent Number: 4,770,620

[45] Date of Patent: Sep. 13, 1988

[54] EXTRUDER APPARATUS FOR SHEATHING A STRAND-FORM PRODUCT, IN PARTICULAR A CABLE

[76] Inventors: Manfred Steinecke, Zum Anger 1a, 3014 Laatzen 4; Heinrich Nettermann, Im Dorffeld 30, 3005 Hemmingen, both of Fed. Rep. of Germany

[21] Appl. No.: 54,304

[22] Filed: May 26, 1987

[30] Foreign Application Priority Data

May 26, 1986 [DE] Fed. Rep. of Germany ....... 3617652

[51] Int. Cl.⁴ ............................................. B29C 47/02
[52] U.S. Cl. .................................... 425/113; 156/500; 425/133.1; 425/192 R; 425/462
[58] Field of Search ...................... 425/114, 133.1, 462, 425/113, 466–468, 376 R, 376 A, 376 B, 192 R; 264/174, 209.8; 156/500

[56] References Cited

U.S. PATENT DOCUMENTS

| | | | |
|---|---|---|---|
| 3,228,356 | 1/1966 | Schafer | 425/462 |
| 3,538,547 | 11/1970 | Drabb | 425/133.1 X |
| 3,606,635 | 9/1971 | Benteler et al. | 264/174 X |
| 4,116,605 | 9/1978 | Burrell | 425/466 |
| 4,247,504 | 1/1981 | Karppo | 264/174 |
| 4,495,022 | 1/1985 | Viriyayuthakorn et al. | 425/133.1 X |
| 4,548,567 | 10/1985 | Missout | 425/133.1 X |
| 4,623,495 | 11/1986 | Degoix et al. | 264/1.5 |

Primary Examiner—Richard L. Chiesa
Attorney, Agent, or Firm—Robert E. Burns; Emmanuel J. Lobato

[57] ABSTRACT

Extrusion head for sheathing a strand-form product, in particular a cable, comprises a central hollow mandrel having a central bore through which the product to be sheathed passes. An intermediate mandrel surrounds the central mandrel with an annular material flow channel between forward portions of the mandrels for applying a first layer of sheathing. The intermediate mandrel has at its forward end a parti-spherical enlargement by means of which it is mounted in a socket at the forward end of a tubular guide piece with a ball and socket type joint permitting angular movement of the intermediate and central mandrels relative to the guide piece which is received in a casing mounted on a support. A second annular material flow channel is provided between the casing and the intermediate mandrel for applying a second layer of sheathing. Material is supplied to the respective annular flow channels by extruders provided at opposite sides of the extrusion head through supply tubes connected with ball-type joints to preclude lodging of sheathing material.

10 Claims, 1 Drawing Sheet

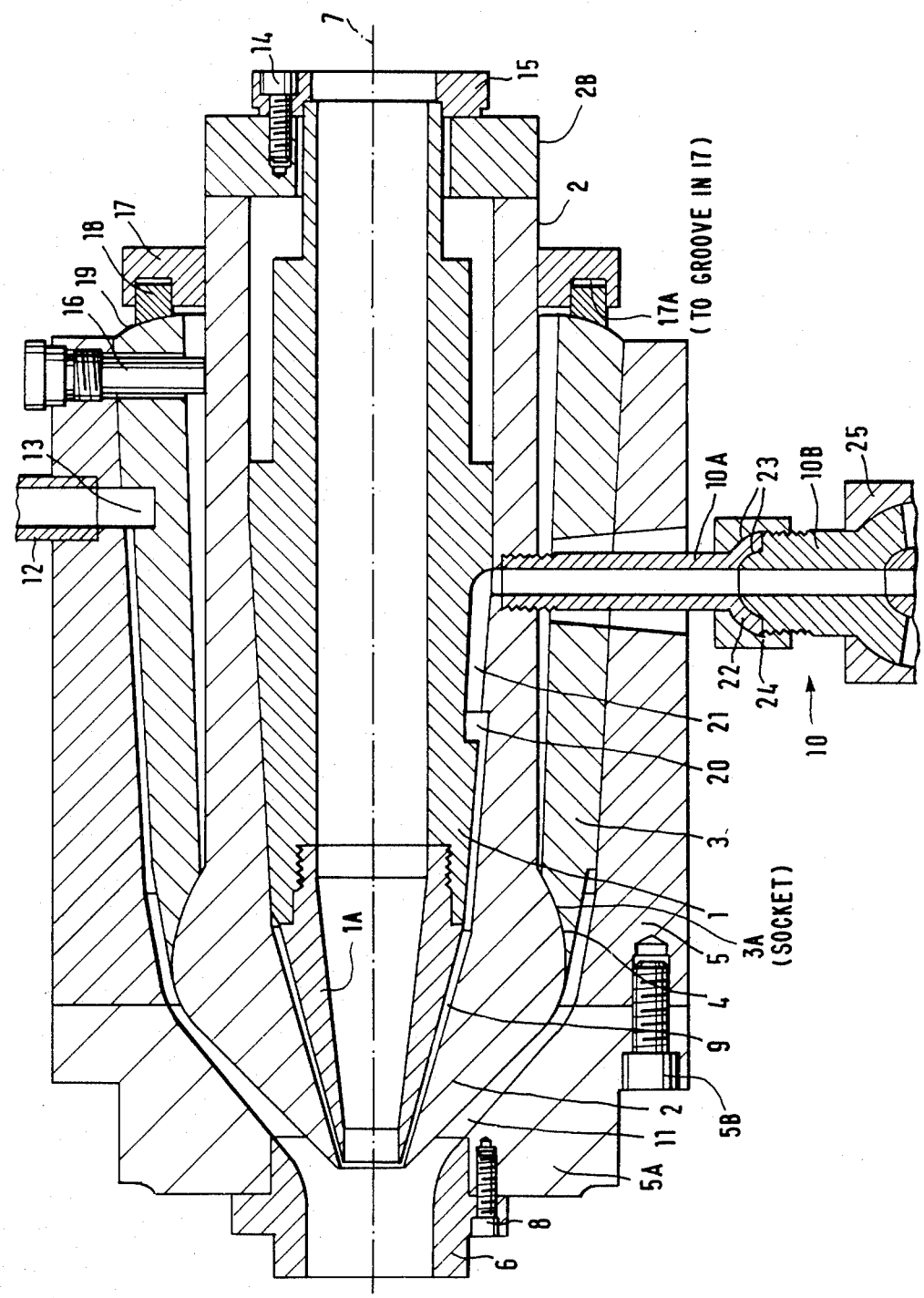

EXTRUDER APPARATUS FOR SHEATHING A STRAND-FORM PRODUCT, IN PARTICULAR A CABLE

FIELD OF INVENTION

The invention relates to extrusion apparatus for sheathing a strand-form product, in particular a cable, with a plurality of directly successively applied layers of plastic and/or rubber or mixture thereof, in which an extruder head is mounted on a machine support and in which extruders arranged at the sides of the extruder head are connected to the extruder head by special connecting pieces, supply tubes or the like, and in which the extruder head comprises a central hollow mandrel through which the product to be sheathed is led and, arranged essentially concentric therewith, a plurality of nozzle-forming extruder devices in the form of mandrels and or conducting pieces which enclose therebetween annular channels of which one end forms the forming nozzles while the other end is connected with an extruder by the supply conduit pieces.

BACKGROUND OF THE INVENTION

On such extrusion apparatus there is produced cable of which the core is led through the bore of the central mandrel and surrounded successively first with a thin semi-conducting layer and later with a strongly insulating layer of non-conducting plastic material. With this extrusion apparatus, the individual mandrels or conducting pieces forming the forming nozzles are arranged stationary exactly centered. By reason of tolerances of the sheathing, cable produced on such extrusion apparatus does not meet the requirements of modern high voltage cable. The thickness of the sheathing around the core is not sufficiently uniform.

There is also known extrusion apparatus in which the mandrels formed as nozzles are divided and the end piece is arranged displaceably transversely of the axis of the mandrel. Through a displacement of the mandrel end piece during operation, the tolerance of the surrounding layers of the cable can be better adjusted, but the cable produced still has flaws, especially in the semiconductive layer. This is attributable to the fact that the material to be extruded lodges in the adjustment places and here begins to polymerize or vulcanize and then during the operation, from time to time, is carried off by the flow of material and because of being already prematurely polymerized or vulcanized forms flaws in the semi-conductive layer. Such flaws must be cut out of the cable. This leads to considerable loss because not only the location of the flaws but also adjacent regions must be cut out. The resulting short lengths of the cable are frequently of limited value when they must be lengthened by being coupled bo other pieces of cable.

SUMMARY OF THE INVENTION

The invention avoids these objections. It is an object of the invention to provide extrusion apparatus with a precision sheathing extrusion head which is adjustable during operation and is so formed that in the flow path of the material to be extruded the material cannot lodge and be prematurely vulcanized or polymerized in the flow paths.

In accordance with the invention, an intermediate mandrel surrounding the central mandrel is mounted in a ball joint so as to be adjustable and securable in adjusted position and a first sheathing material supply tube extending laterally from the intermediate mandrel is connected by a ball joint to a further sheathing material supply tube which in turn is connected by a ball joint to the extruder.

Such connection with ball joints assures that there are no pockets or projections in which, or behind which, material can lodge outside the flow path of the material to be extruded. However, the technical success of the invention is not attained through the use of such ball joints alone. The material supply tube must also be formed in such manner that no material to be extruded can lodge or be retained. This is achieved by the extruder apparatus in accordance with the invention.

It is advantageous when the intermediate mandrel is inserted in a tubular guide sleeve having at its forward end a spherical socket which receives an enlarged forward end portion of the intermediate mandrel in such manner that the intermediate mandrel can be removed in the extrusion direction for cleaning.

It is advantageous when the guide sleeve has on its rear end an annular parti-spherical surface against which a pretensioned ring on the intermediate mandrel presses and also acts as a seal. Through this ring there is obtained a pretensioning which presses a spherical surface on the intermediate mandrel into a spherical socket on the forward end of the guide sleeve and thereby prevents material from being pressed between these surfaces in the starting condition. The surface between the rear end of the guide sleeve and the pressing ring is formed as a parti-spherical surface so that there in adjustment a uniform relation is retained.

A simple adjustment possibility is attained by providing at least three adjustment screws arranged between the guide sleeve and a rear portion of the intermediate mandrel. Furthermore, it is advantageous for favorable adjustability when the central mandrel is adjustable and securable relative to the machine support and relative to the surrounding intermediate mandrel. A cup-shaped object can be introduced into the mandrel in a similar manner. Thereby the layer to be applied can be adjusted precisely. A particular advantage is that in adjustment of the intermediate mandrel the material guide channel is not altered.

If a further coating layer is to be provided, this is usually thin and the material flow is not as much of a problem as with the inner layer. Therefore it is advantageous when further outwardly arranged tube pieces of outer nozzles are arranged adjustable and securable perpendicularly to the inner mandrel and the support.

In order that the supply tube conduit can move freely in an adjustment of the second nozzle tube it is advantageous when in the casing at the position of the material supply tube there is provided an opening of larger diameter than the diameter of the material supply tube.

In order to secure the second nozzle tube piece in a fixed position after adjustment, it is advantageous when there is provided on the rear end of the central mandrel a flange having openings through which screws are inserted parallel to the axis of the mandrel.

In order to provide a good supply of the material it is advantageous when there is provided a flow channel parallel to the axis between the end of the supply tube and a distribution channel for the material

BRIEF DESCRIPTION OF DRAWING

The nature, objects and advantages of the invention will be more fully understood from the following description in conjunction with the drawing in which the single FIGURE represents an axial horizontal section of an extrusion head for sheathing a strand-form product, in particular, a cable.

DESCRIPTION OF PREFERRED EMBODIMENT

The extrusion head illustrated in the drawing is mounted on a machine base or frame which is not shown. Two extruders, likewise not shown, are mounted on opposite sides of the extrusion head and are displaceable and securable in a direction perpandicular to the axis 7 of the extrusion head.

The extrusion head illustrated in the drawing comprises a central mandrel 1, through a central bore of which the product to be sheathed is passed from right to left. The central mandrel 1, has at its forward end, a removable and replacable section 1A, having a tapered bore ending in an exit opening which closely embraces the product to be sheathed.

A likewise hollow intermediate mandrel 2, concentric with the axis 7 surrounds the central mandrel 1, and has an enlarged forward end portion 2A provided with a partispherical surface 4. A tubular guide sleeve 3, surrounds the intermediate mandrel 2 and has at its forward end a partispherical socket 3A, which receives the enlarged forward portion of the intermediate mandrel to provide a ball and socket joint. The bore of the guide sleeve 3 is tapered to provide between the intermediate mandrel 2 and the guide sleeve 3 a space permitting angular movement of the intermediate mandrel 2, relative to the guide sleeve 3 about a center defined by the parti spherical surface 4 and socket 3A.

The guide sleeve is surrounded by a casing 5, which is mounted fast on the machine base or frame and is provided with a removable front end portion 5A secured by a plurality of screws 5B. A mouth piece 6 concentric with the axis 7 is secured on the front end portion 5A of the casing 5 by means of screws 8.

Between the central mandrel 1, and the intermediate mandrel 2 there is formed an annular material guide channel 9 which terminates in the mouth piece 6 so as to apply a first layer of sheathing material to the product as is passes axially through the central mandrel 1. Sheathing material is fed to the annular channel 9 from an extruder (not shown) at one side of the extrusion head through special connecting pieces which form a material supply tube 10. Between the intermediate mandrel 2 and the casing 5 there is formed a further annular sheathing material guide channel 11 opening into the mouthpiece 6, downstream of the annular channel 9, so as to apply a second layer of sheathing material to the product. A second extruder (not shown) on the opposite side of the extrusion head supplies sheathing material to the annular channel 11 through a material supply tube 12 and material distribution channel 13.

In producing a cable, the cable core is led through the bore of the central mandrel 1 and first receives a thin layer of semi-conducting material which is supplied through the material guide channel 9 and immediately thereafter receives a thicker layer of insulating material supplied through the material guide channel 11.

The intermediate mandrel 2 can be withdrawn from the guide sleeve 3 and casing 5 upon removal of the supply tube 10 and the end portion 5A of the casing together with the mouth piece 6. In order that the intermediate mandrel 2, after adjustment of the material guiding channel 9 can be secured fast with the central mandrel 1 screws 14 screwing into a flange 2A at the rear end of the intermediate mandrel 2, secure a flange 15 which engages the rear end of the central mandrel 1.

An adjustment of the intermediate mandrel 2 relative to the casing 5 and thereby relative to the machine base or frame, is achieved by means of at least three adjustment screws 16, which are screwed through radial holes in the guide sleeve 3 and with their inner ends engage the intermediate mandrel 2. Adjustment is permitted by means of the ball joint provided by the parti-spherical surface 4 and the socket 3A of the guide sleeve 3.

To provide a rear seal the intermediate mandrel 2 carries on its rear end a flange 17, having a groove 17A receiving a resilient ring 18, for example of rubber, pressing on the rear end of the guide sleeve 3. The flange 17 is removably secured on the intermediate mandrel 2 by means of set screws or threads (not shown). The rear end surface 19 of the guide sleeve 3, is of spherical curvature permitting angular movement between the guide sleeve 3 and the intermediate mandrel 2.

The supply of sheathing material to the annular material guide channel 9 is effected by a circumferentially extending distribution channel 20, which is connected with the material supply tube 10 through an axially extending flow channel 21. The material supply tube 10 comprises an inner supply tube 10A which is screwed into a tapped hole in the intermediate mandrel 2. On its outer end the inner material supply tube 10A is provided with a spherical cap-like enlargement 22 which receives a likewise spherical end piece 23 of an outer material supply tube 10B. The end of the outer material supply tube 10B is provided with a thread on which is screwed a screw cap 24, provided with an inner spherical ring surface which engages the spherical caplike enlargement 22 of the inner supply tube 10A. In like manner, the outer supply tube 10B is connected by a screw cap 25, with a further supply tube or with the respective extruder. The inner supply tube 10A extends out through openings in the guide sleeve 3 and the casing 5, having an inner diameter larger than the outer diameter of the inner guide tube 10A so as to permit angular movement of the intermediate mandrel 2 relative to the guide sleeve 3 and the casing 5.

Channels for a temperature control medium can if desired be provided in the mandrels 1 and 2, the guide sleeve 3 and the casing 5.

In the event that further sheathing layers are desired the casing 5 as provided with additional annular material guiding channels similar to the channel 11.

What we claim is:

1. Extrusion apparatus for sheathing a strand-form product, in particular a cable, comprising:
    a central hollow mandrel having a central bore through which the product to be sheathed passes,
    an intermediate mandrel surrounding said central mandrel with a first annular flow channel between forward portions of said central mandrel and said intermediate mandrel, said intermediate mandrel having an enlarged forward end portion with a parti-spherical surface,
    a guide sleeve surrounding said intermediate mandrel with an annular space between rear portions of said guide sleeve and said intermediate mandrel, said guide sleeve having at its forward end a socket receiving said enlarged forward end portion of said intermediate mandrel to form a ball joint,
    means acting resiliently between said intermediate mandrel and said guide sleeve to urge said guide sleeve forwardly relative to said intermediate mandrel and thereby maintain said enlarged forward end portion of said intermediate mandrel seated in said socket of said guide sleeve, a casing surrounding said guide sleeve and intermediate mandrel with second annular flow channel between said casing and said enlarged forward end portion of said intermediate mandrel, a mouth piece removably mounted on a forward end of said casing and having an aperture through which said product passes, means acting between a rear portion of said guide sleeve and a rear portion of said intermediate mandrel for varying the angular relation between said intermediate mandrel and said guide sleeve, first supply means for supplying sheathing material to said first annular flow channel and second supply means for supplying sheathing material to said second annular flow channel, to supply successive coatings to a product passed through a central mandrel.

2. Extrusion apparatus according to claim 1, in which said first supply means comprises a supply tube fixed in a radial opening of said intermediate mandrel and extending out through openings in said guide sleeve and said casing larger than said supply tube.

3. Extrusion apparatus according to claim 2, in which said supply tube comprises an inner portion and an outer portion connected by a ball joint to said inner portion.

4. Extrusion apparatus according to claim 2, further comprising a circumferentially extending distribution channel at the rear of said first annular flow channel and an axially extending supply channel extending between an inner end of said supply tube and said distribution channel.

5. Extrusion apparatus sccording to claim 1, in which said guide sleeve has a parti-spherical rear end surface and in which said means for urging said guide sleeve forwardly relative to said intermediate mandrel comprising a resilient ring between said rear end of said guide sleeve and a flange on said intermediate mandrel.

6. Extrusion apparatus according to claim 1, in which said means for varying the angular relation of said intermediate mandrel relative to said guide sleeve comprises at least three screws extending through said casing and guide sleeve and bearing on a rear end portion of said intermediate mandrel.

7. Extrusion apparatus according to claim 1, in which said casing comprises a rear portion and a front end portion removably secured to said rear portion, said front end portion being removable for disassembly.

8. Extrusion apparatus according to claim 1, in which a collar removably secured on a rear end of said intermediate mandrel bears on a rear end of said central mandrel to retain said central mandrel in said intermediate mandrel.

9. Extrusion apparatus for sheathing a strand-form product, in particular a cable, comprising:

a central hollow mandrel having a central bore through which the product to be sheathed passes, an intermediate mandrel surrounding said central mandrel with a first annular flow channel between forward portions of said central mandrel and said intermediate mandrel, a guide sleeve surrounding sid intermediate mandrel, a casing surrounding said guide sleeve and intermediate mandrel with a second annular flow channel between forward portions of said casing and said intermediate mandrel, means for varying the angular relation between said intermediate mandrel and said guide sleeve and casing, first supply means for supplying sheathing material to said first annular flow channel and second supply means for supplying sheathing material to said second annular flow channel, said first supply means comprising a supply tube extending radially from said intermediate mandrel out through openings in said guide sleeve and casing larger than said supply tube, said supply tube comprising an inner portion secured to said intermediate mandrel and an outer portion connected by a ball joint to said inner portion.

10. Extrusion apparatus according to claim 9, further comprising a circumferentially extending distribution channel at the rear of said first annular flow channel and an axially extending flow channel extending from an inner end of said supply tube to said distribution channel.

* * * * *